United States Patent Office 3,047,010
Patented July 31, 1962

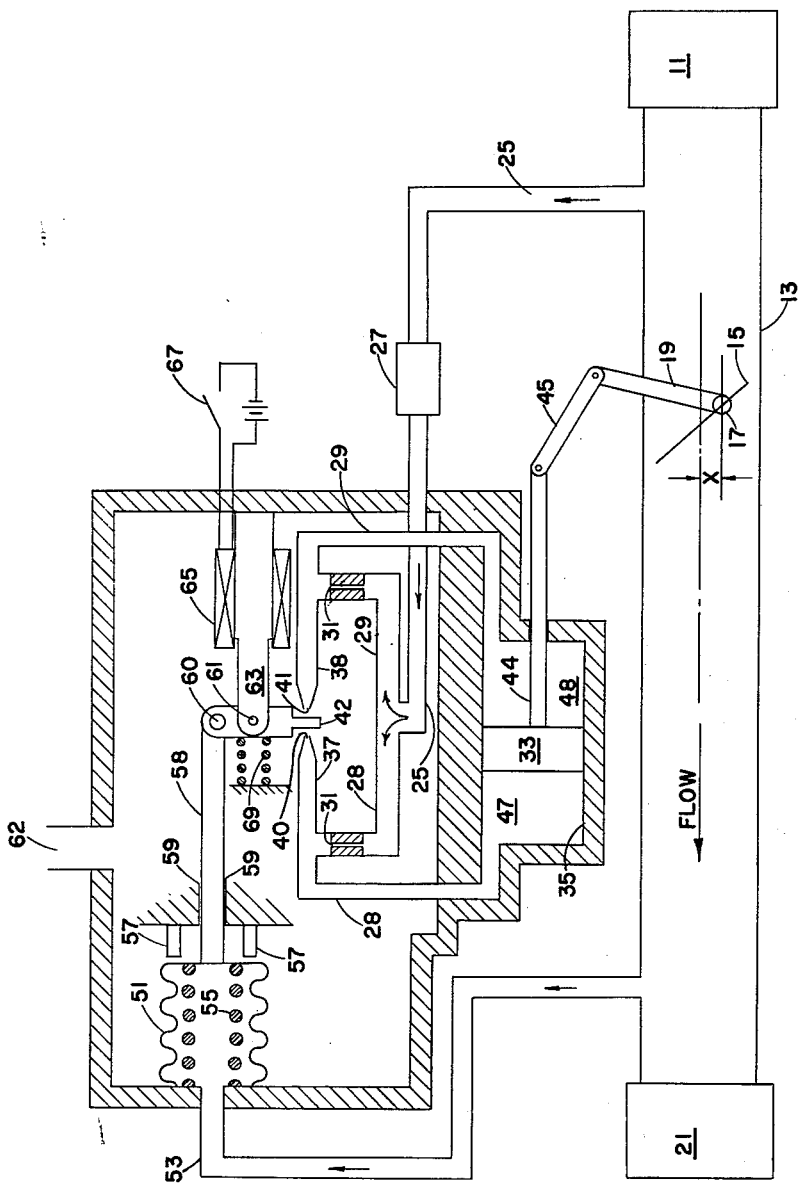

3,047,010
AIR PRESSURE REGULATOR
Neal B. Rothfuss, Clinton, N.Y., assignor to The Bendix Corporation, a corporation of Delaware
Filed June 9, 1958, Ser. No. 740,747
3 Claims. (Cl. 137—489)

This invention relates to a system for providing air pressure regulation and more particularly concerns a control arrangement for a butterfly valve in a flow path extending from a variable pressure source to a device which requires air at regulated pressure.

An object of the present invention is to provide an improved system for air pressure regulation in which a butterfly-type valve is used and in which reverse flow of air through the valve from the device being supplied is prevented when there is pressure reversal. Another object is the provision of pressure-regulating system in which a pressure responsive control and a shut-off control adjust a valve through a common control element of a servo device. A further object is the provision of a butterfly-type valve and control by which improved pressure-regulation and automatic self-closing are obtained. An additional object is the provision of a single butterfly valve arrangement which combines automatic closing, in the event of pressure reversal, with downstream pressure regulation and shut-off control whereby the use of two valves as in prior systems is not required.

The realization of the above objects by the present invention, along with the features and advantages thereof, will be apparent from the following description and the accompanying drawing which schematically shows an off-set butterfly valve, a servo actuator for the valve, pressure-responsive means for controlling the servo actuator and manually-operated shut-off means for the servo actuator.

Referring to the drawing, a source of variably pressurized air 11, such as jet engine, is connected to the inlet end of a circular tube or conduit 13 which has a butterfly valve 15 mounted therein and arranged to open toward the outlet end of the conduit 13. The circular butterfly valve 15 is mounted on an off-centered rotatable shaft 17 which has an operating arm 19 connected thereto for rotating the valve 15. When closed, valve 15 will be inclined toward the outlet end of conduit 13. Tube 13 is connected at its other outlet end to a device 21 which requires a supply of regulated pressure air, such as an air cycle refrigeration system for a cockpit in an aircraft. It is to be noted that shaft 17 of the valve 15 is appreciably offset from the axial center line of the tube 13 by a vertical distance X which is about one sixth the diameter of the tube. With this arrangement, the valve will be urged toward open position during pressure regulation and will be closed when the outlet pressure exceeds a low inlet pressure in the event of engine malfunction due to the larger area above the valve axis.

The control for the valve 15 is comprised of three sub-units, a servo device for positioning the butterfly valve, downstream pressure-responsive means for operating the servo device, and manually-operated shut-off means for closing the valve while under the control of the pressure-responsive means.

The servo means or device receives engine bleed air through pipe 25 having air filter 27. Pipe 25 connects to tube 13 upstream of valve 15 and extends to two branch pipes 28 and 29, each of which have a primary restricted orifice 31. Pipes 28 and 29 extend to chambers at each side of actuating piston 33 which slides in cylinder 35. Two vent conduits 37 and 38 connect into pipes 28 and 29 downstream of orifices 31 and terminate in secondary restricted orifices 40, 41 which are opposite each other and are adapted to be alternately restricted or blocked by a flapper element or valve 42 when it is pivoted toward one of the closely-spaced orifices 40 or 41.

The actuating piston 33 has rod 44 which is connected by a link 45 to operating arm 19 so that motion of rod 44 will move the butterfly valve 15. The motion of rod 44 will vary with the position of pivoted flapper valve 42 (which regulates the continuously-flowing air from secondary orifices 40, 41) since the chambers at each side of the piston 33 are thereby alternately vented to varying extents with resulting pressure changes in the chambers. The valve-closing chamber 47 is at the left of piston 33 while the valve-opening chamber 48 is at the right side.

The downstream pressure-responsive means for operating the servo device includes a bellows 51 which is interiorly connected by pipe 53 to the tube 13 downstream of valve 15. A spring 55 biases the bellows towards bellows stops 57 which limit the expansion of the bellows. A bellows rod 58 is supported in guide 59 and is rotatably connected by pin 60 to the top of flapper valve 42. It is apparent that variations in regulated pressure in the bellows 51 causes the flapper valve 42 to pivot about its pivot connection 61 which is fixed during pressure regulation. Vent 62 from the housing to ambient pressure provides a reference for the bellows and an escape for the servo gases from orifices 40 and 41.

The manually-operated means for shut-off includes a solenoid plunger 63 which is connected to the normally-fixed pivot pin 61 at the intermediate part of the flapper valve 42. Solenoid 65 is operated to move the plunger 63 to the left toward the bellows by closing the manual switch 67 in the battery-energized circuit to the solenoid. This leftward movement causes the flapper to pivot about 60 toward orifice 40. A spring 69 opposes this leftward motion and normally holds the pivot pin 61 in position. It is to be noted that the spring 69 is opposite the longitudinal center of the solenoid plunger 63 and urges the plunger 63 against the stop provided by the housing to give a fixed position for pin 61 during pressure regulation. Spring 69 also prevents blacklash in the flapper connections 60 and 61.

In operation, changes in downstream pressure from the desired valve are sensed through pipe 53 by bellows 51. The mechanical output from the bellows system pivots the lower end of flapper valve 42 about pivot pin 61 through a distance proportional to the error signal. As the flapper 42 is displaced either way from neutral, the pressure increases in the passages on the side the flapper is moving toward and decreases on the side from which the flapper is moving away. A differential pressure across the actuating piston 33 results and this piston repositions the butterfly valve 15. For example, if a high pressure is sensed, the bottom of the flapper valve 42 will be moved to the left or clockwise and restrict the flow from orifice 40 and the pressure at the left of the piston 33 will build up. This pressure increase will cause the piston 33 to move to the right and, through the linkage to the butterfly valve 15, cause the valve 15 to move toward closed position. Pressure at the right of the piston will, of course, be decreased since the flapper 42 is not as close to orifice 41. A low downstream pressure will produce the opposite result. Thus, variations in regulated pressure in the bellows 51 cause forces in the flapper valve linkage which are manifested as flapper positions. These positions, in turn, cause proper positioning of the piston 33 and the butterfly valve 15 through the piston linkage to the off-centered valve shaft 17.

It is to be noted that the offsetting of the butterfly axis provides the control with a unidirectional net reaction force. Since the forces on each side of the axis of the butterfly valve are not equal, it is apparent that the control will normally be acting against a force which tends to pivot the butterfly in a counterclockwise direction. This arrangement avoids the possibility of flutter in the operating range as might occur if there were equal areas and balanced forces and results in more stable regulation.

If it is desired to stop the flow of regulated pressure air to the utilizing device 21, switch 67 can be closed. Energization of the solenoid 65 causes the solenoid plunger 63 to overcome the pre-load of the spring 69. Pin 60 stays fixed relative to the flapper movement and the flapper valve 42 pivots sufficiently to upset the control system. The false signal created causes the actuator to close the butterfly valve. Flapper 42 will be moved to restrict orifice 40 sufficiently to close valve 15. Failure of the bellows during shut-down will not result in opening of the valve. This shut-off operation will be made by the pilot closing switch 67 if, for example, the air source contains oil from an engine leak.

Automatic closing of the butterfly valve, in the event of pressure reversal or if the source of pressure fails, occurs due to the offsetting of the butterfly axis. This offsetting results in a closing force which overrides the control. When the butterfly valve is subjected to a reverse pressure condition, the "upstream" pressure at the right of the valve is at some relative low value and the "downstream" at the left of the valve is higher. Thus, pneumatic pressure for servo operation is low and gives a low actuator force. A closing torque also results which is caused by the differential pressure across the offset and the unequal butterfly areas. This closing torque is greater than the actuating piston differential pressure and the butterfly closes. The butterfly cannot be opened when in this fail-safe or checked position. Failure of the control linkage or actuating piston cannot cause the butterfly valve to open.

From the foregoing it is apparent that offsetting of the butterfly valve gives more stable control as well as automatic closing in the event of pressure reversal. Further, a single butterfly valve provides pressure regulation and shut-off due to the arrangement of the pressure responsive device, the solenoid-plunger-pivot and the servo control element or flapper.

It is to be understood that persons skilled in the art can make changes in the embodiment of the invention herein disclosed without departing from the invention as set forth in the appended claims.

What is claimed is:

1. An air pressure regulating system comprised of a tubular conduit having an inlet end and an outlet end, a pressure-regulating butterfly valve rotatably mounted in said conduit on a shaft extending across said conduit and arranged to open from contact with said conduit toward said outlet end, said shaft being off-set from the axial center line of said conduit so that by pressure unbalance said valve will be urged toward open position during pressure regulation and will be closed when outlet pressure in said conduit exceeds the inlet pressure, servo means including an actuating piston for adjusting said valve, said servo means being connected to said conduit upstream of said butterfly valve and arranged to admit upstream air to each side of said piston, said piston being operably linked to said shaft to cause said butterfly valve to open toward said outlet end of said conduit, said servo means having a vent device for variably releasing air alternately from the sides of said piston, bellows means responsive to the pressure in said conduit downstream of said butterfly valve for adjusting said vent device and hence regulating the pressure differential on said actuating piston for adjusting said valve and shut-off means including a manually-operated control for causing said vent device, while under control of said bellows means, to give a valve-closing pressure differential on said actuating piston.

2. An air pressure regulating system comprised of a tubular flow conduit, a pressure-regulating butterfly valve pivotally mounted within said conduit, said valve being mounted on an off-center shaft extending across said conduit and arranged to open from contact with said conduit in the direction of flow so that pressure unbalance during regulation urges said valve toward open position and when upstream pressure fails said valve will close under pressure unbalance, an actuating piston operably connected to said valve for adjusting said valve from contact with said conduit, a first valve-opening chamber at one side of said piston, a second valve-closing chamber at the other side of said piston, means for admitting air from upstream of said valve to each of said chambers, a first vent terminating in a first orifice for venting said first chamber, a second vent terminating in a second orifice which is located opposite said first orifice for venting said second chamber, said orifices being closely-spaced, a flapper element having one end extending between said opposed orifices, said flapper element being pivotally-mounted at an intermediate location, a bellows interiorly connected to said flow conduit downstream of said valve, said bellows being operably connected by a rod to the other end of said pivoted flapper element for regulating the venting from said orifices by positioning said flapper element relative to said orifices, and shut-off means having a manual control arranged to cause said flapper element to vent said valve-opening chamber by pivoting said flapper element at its other end which is connected to said bellows rod.

3. An air pressure regulating system comprised of tubular flow conduit, a pressure-regulating butterfly valve rotatably mounted on an off-center shaft extending across said conduit and arranged to open from contact with said conduit in the direction of flow so that pressure unbalance during regulation urges said valve toward open position and when upstream pressure fails said valve will close under pressure unbalance, an actuating piston operably connected to said valve for adjusting said valve from contact with said conduit, a first valve-opening chamber at one side of said piston, a second valve-closing chamber at the other side of said piston, means including a flow-restricting orifice for admitting air from said conduit upstream of said valve to each of said chambers, a first vent terminating in a first orifice for venting said first chamber, a second vent terminating in a second orifice which is located opposite said first orifice for venting said second chamber, said orifices being closely-spaced, a flapper element having one end extending between said opposed orifices, said flapper element being pivotally-mounted at an intermediate location, a bellows interiorly connected to said flow conduit downstream of said valve, said bellows being operably connected by a rod to the other end of said pivoted flapper element for regulating the venting from said orifices by positioning said flapper element relative to said orifices, stop means for limiting the expansion of said bellows, the pivotal-mounting of said flapper element being provided by a pin mounted in the end of a solenoid plunger, said plunger having a solenoid coil, means for energizing said solenoid, a spring abutting opposite the pivot end of said plunger the intermediate part of said flapper element, said plunger when its coil is energized being arranged to cause said flapper element to vent said valve-opening chamber.

References Cited in the file of this patent

UNITED STATES PATENTS

| | | |
|---|---|---|
| 629,449 | Locke | July 25, 1899 |
| 1,546,356 | Anderson | July 21, 1925 |
| 2,544,520 | Ball | Mar. 6, 1951 |
| 2,630,132 | Hughes | Mar. 3, 1953 |
| 2,731,980 | Diefenderfer | Jan. 24, 1956 |
| 2,812,774 | Anderson | Nov. 12, 1957 |
| 2,882,916 | Ochs | Apr. 21, 1959 |
| 2,893,414 | Snyder | July 7, 1959 |

FOREIGN PATENTS

| | | |
|---|---|---|
| 680,141 | Germany | Aug. 23, 1939 |
| 713,312 | Germany | Mar. 21, 1942 |